US012751582B2

(12) United States Patent
Qiu et al.

(10) Patent No.: US 12,751,582 B2
(45) Date of Patent: Oct. 6, 2026

(54) CONTROL CENTER BOX AND FLEXIBLE BATHTUB

(71) Applicant: Jiaxing Virpol Sanitary Ware Co., LTD., Jiaxing City (CN)

(72) Inventors: Baien Qiu, Jiaxing City (CN); Baisi Qiu, Jiaxing City (CN); Zhisong Qiu, Jiaxing City (CN)

(73) Assignee: Jiaxing Virpol Sanitary Ware Co., LTD., Jiaxing City (CN)

(*) Notice: Subject to any disclaimer, the term of this patent is extended or adjusted under 35 U.S.C. 154(b) by 0 days.

(21) Appl. No.: 19/415,016

(22) Filed: Dec. 10, 2025

(65) Prior Publication Data

US 2026/0157577 A1 Jun. 11, 2026

(30) Foreign Application Priority Data

Dec. 10, 2024 (CN) ........................ 202411807927.6
Nov. 12, 2025 (CN) ........................ 202522405240.6

(51) Int. Cl.
*A47K 3/00* (2006.01)
*A47K 3/02* (2006.01)
(Continued)

(52) U.S. Cl.
CPC ................ *A47K 3/001* (2013.01); *A47K 3/02* (2013.01); *B01D 29/01* (2013.01); *B01D 35/306* (2013.01);
(Continued)

(58) Field of Classification Search
CPC .......... A47K 3/001; A47K 3/02; A61H 33/02; B01D 29/01; B01D 35/306; B01D 39/18; C02F 1/001; C02F 1/008; C02F 1/32; C02F 2103/42; C02F 2301/046; C02F 2303/04; G10K 11/161; H04R 1/028
(Continued)

(56) References Cited

U.S. PATENT DOCUMENTS 3,276,458 A * 10/1966 Davis ........................ C02F 9/00 210/85
5,361,215 A * 11/1994 Tompkins .......... G05D 23/1931 236/12.12
6,003,166 A * 12/1999 Hald ................. A61H 33/6026 4/492
7,393,450 B2 * 7/2008 Silveri .................... C02F 1/008 210/85
7,484,938 B2 * 2/2009 Allen ...................... F04D 15/00 417/12
10,010,634 B2 * 7/2018 Bonutti ..................... A61L 2/10
10,221,853 B2 * 3/2019 Nix ......................... F04B 49/20
(Continued)

FOREIGN PATENT DOCUMENTS

KR 20110099978 A * 9/2011 ............... A47K 3/10

*Primary Examiner* — Lori L Baker
(74) *Attorney, Agent, or Firm* — Schwegman Lundberg & Woessner, P.A.

(57) ABSTRACT

A flexible bathtub comprises a tub body, wherein the tub body is internally provided with a delivery pipeline, a plurality of nozzles, and a filter. Water is added into the tub body. When a control system receives an instruction, a water pump will start first to provide power for the entire water circulation system. With the startup of the water pump, the water stored in the tub body is pumped from a water return inlet into a filter. The pumped water passes through the filter cotton inside the filter in sequence for filtering. The filtered water is sent to a heater and a UV sterilizer for heating and sterilization along a water return pipe connector and a first pipeline, and the processed water enters the delivery pipeline along a second pipeline, ensuring that the water flows from each of the nozzles. And a closed-loop water circulation system is formed.

15 Claims, 6 Drawing Sheets

(51) Int. Cl.

| | |
|---|---|
| ***B01D 29/01*** | (2006.01) |
| ***B01D 35/30*** | (2006.01) |
| ***B01D 39/18*** | (2006.01) |
| ***C02F 1/00*** | (2023.01) |
| ***C02F 1/32*** | (2023.01) |
| ***C02F 103/42*** | (2006.01) |
| ***G10K 11/16*** | (2006.01) |
| ***H04R 1/02*** | (2006.01) |

(52) U.S. Cl.
CPC .............. *B01D 39/18* (2013.01); *C02F 1/001* (2013.01); *C02F 1/008* (2013.01); *C02F 1/32* (2013.01); *G10K 11/161* (2013.01); *H04R 1/028* (2013.01); *C02F 2103/42* (2013.01); *C02F 2301/046* (2013.01); *C02F 2303/04* (2013.01)

(58) Field of Classification Search
USPC ...................................................... 4/546, 456
See application file for complete search history.

(56) References Cited

U.S. PATENT DOCUMENTS

| | | | | |
|---|---|---|---|---|
| 10,660,819 | B2 * | 5/2020 | Liu | A61H 33/0087 |
| 11,000,449 | B2 * | 5/2021 | Potucek | H05B 47/105 |
| 11,035,069 | B2 * | 6/2021 | Lee | D06F 37/04 |
| 11,116,692 | B2 * | 9/2021 | Laflamme | A61H 33/00 |
| 11,305,025 | B1 * | 4/2022 | Barry | A61L 2/10 |
| 11,554,187 | B2 * | 1/2023 | Nissenbaum | A61B 90/70 |
| 11,720,085 | B2 * | 8/2023 | Roy | G01K 3/005 700/275 |
| 11,904,060 | B2 * | 2/2024 | Saxena | A61L 2/10 |
| 12,533,432 | B2 * | 1/2026 | Kim | A61L 2/10 |
| 2003/0168516 | A1 * | 9/2003 | Cline | E04H 4/129 237/2 A |
| 2014/0238913 | A1 * | 8/2014 | Hoang | E04H 4/129 210/182 |
| 2015/0209457 | A1 * | 7/2015 | Bonutti | C02F 1/325 250/435 |
| 2017/0291141 | A1 * | 10/2017 | Dunham | B01D 61/025 |
| 2024/0197563 | A1 * | 6/2024 | Zhang | H02H 3/162 |
| 2025/0155143 | A1 * | 5/2025 | Tomalin | F24F 11/84 |
| 2026/0029158 | A1 * | 1/2026 | Qiu | F24H 1/10 |

* cited by examiner

CONTROL CENTER BOX AND FLEXIBLE BATHTUB

CLAIM FOR PRIORITY

This application claims the benefit of priority of Chinese Application No. 202522405240.6, filed Nov. 12, 2025, and Chinese Application No. 202411807927.6, filed Dec. 10, 2025, each of which is incorporated by reference in its entirety.

TECHNICAL FIELD

The present disclosure relates to the technical field of sanitary ware, in particularly to a novel flexible bathtub.

BACKGROUND

In terms of bathroom facilities, bathtubs are one of the important facilities for home bathing.

1. In a manufacturing process of traditional bathtubs, acrylic is usually molded first and then reinforced with a mixture of glass fiber and resin. This manufacturing process is environmentally polluting, non-recyclable, and causes a certain degree of harm to operators.

2. Traditional bathtubs consume a large amount of electricity during bathing and require substantial energy to provide thermal energy. Novel flexible bathtubs are made of EPE (Expanded Polyethylene) foam, and such EPE foam is inherently a thermal insulation material with low heat loss.

3. During the installation of traditional acrylic bathtubs, a crane is required, which limits installation locations. The novel flexible bathtubs are extremely lightweight, accounting for only 1/10 of the weight of traditional bathtubs, and can be installed in any location.

4. Traditional acrylic outdoor bathtubs generate significant noise during use. In the present disclosure, a silent water pump is used, and the water pump is sealed in a EPE foam insulation box to further reduce noise, thereby achieving a silent operation effect.

SUMMARY

To address the deficiencies of the prior art, an object of the present disclosure is to provide a novel flexible bathtub that is environmentally friendly, energy-saving, lightweight, comfortable, and easy to clean.

To achieve the above object, the present disclosure provides a control center box suitable for a flexible bathtub, including:

- a box body having an accommodating cavity;
- a thermal insulation layer attached to an inner wall of the box body; and
- a control system, a UV (Ultraviolet) sterilizer, a water pump, a first pipeline, and a second pipeline which are arranged in the accommodating cavity and wrapped by the thermal insulation layer, wherein the control system is integrated with a controller and a heater with a heating chamber; the controller is electrically connected to the heater, the water pump, and the UV sterilizer; the UV sterilizer is internally provided with a sterilization chamber; both the heating chamber and the sterilization chamber are connected between the first pipeline and the second pipeline; and the water pump drives water to flow through the first pipeline, the sterilization chamber, the heating chamber, and the second pipeline to form a water circulation path.

Specifically, the thermal insulation layer may be made of EPE foam. The thermal insulation layer is attached to an inner wall of the box body, to effectively block heat loss from the heating chamber, pipelines, and hot water to the outside, significantly reduce the energy consumption of the heater required to maintain a set water temperature, and achieve a purpose of energy saving. The water pump drives water to continuously flow in a circulation path including the heating chamber, such that the water temperature of the entire bathtub quickly reaches a set value and can be distributed uniformly, and local overheating or undercooling is avoided. Moreover, the water temperature can stably maintain a comfortable temperature required by the user for a long time, providing a continuous and stable bathing experience. The UV (Ultraviolet) sterilizer is wrapped in the thermal insulation layer and the box body, and will not leak, thereby ensuring safety during use. The sterilization chamber is integrated into the water circulation path, and when water flows through the sterilization chamber, the water is directly irradiated by ultraviolet light, so microorganisms such as bacteria and viruses in the water will be effectively killed. Compared with chemical disinfectants, UV sterilization does not produce harmful by-products or chemical residues, and avoids problems such as skin irritation and peculiar odors, so UV sterilization is more environmentally friendly. All the core components such as the controller, heater, UV sterilizer, water pump, and pipelines are integrated into an accommodating cavity of the box body and are wrapped and fixed by the thermal insulation layer. This highly integrated design greatly saves space and makes the entire structure compact. The controller is electrically connected to the heater, the water pump, and the UV sterilizer through wires, facilitating integrated control.

The present disclosure is further configured as follows: the heating chamber and the sterilization chamber are arranged in parallel to form a parallel and co-directional water circulation path. After parallel connection, the total flow is split into two independent branches, and the heated water and sterilized water are quickly and uniformly mixed, so as to reduce temperature stratification and local overheating or undercooling, and improve the overall water temperature uniformity and comfort. In addition, a total pressure drop of a parallel arrangement is significantly lower than a superimposed total pressure drop of a series arrangement. The water pump only needs to overcome the pressure drop of the branch with a higher resistance in the parallel loop, so the required head and power are significantly reduced, and the operation is more energy-saving. Low-resistance operation reduces the mechanical and thermal loads of the water pump, minimizes wear, and prolongs the service life of the water pump.

The present disclosure is further configured as follows: a coil wound in a spiral manner is attached to an outer wall of a housing of the water pump; an inlet end of the coil is in communication with the first pipeline; and an outlet end of the coil is in communication with the second pipeline. The heat generated by the water pump during operation will heat the housing; the spiral coil is arranged closely against the housing, and this part of waste heat is efficiently absorbed through heat conduction. Meanwhile, the cold water flowing in the coil continuously takes away the heat of the housing, and provides cooling for the water pump. The coil is an integrally formed stainless steel pipe, titanium pipe, or copper pipe. All three materials including stainless steel, titanium, and copper have excellent corrosion resistance and good thermal conductivity, thereby ensuring uniform and stable heat exchange performance of the entire coil. The integrally formed structure means that the entire coil is bent from a single complete steel pipe without welds or joints, avoiding leakage problems caused by welding defects. In addition, the inner wall of the integrally formed coil is smooth, and the fluid flow resistance is low.

The present disclosure is further configured as follows: the water pump is driven by a dual-speed motor, and the dual-speed motor operates by switching between a low-speed gear and a high-speed gear, a flow rate of the low-speed gear being 40% to 60% of a rated flow rate, and a flow rate of the high-speed gear being 85% to 105% of the rated flow rate. The dual-speed motor realizes rotational speed change by switching the number of internal winding poles; the rotational speed of the high-speed gear is approximately twice that of the low-speed gear, and the power consumption of the low-speed gear is much lower than that of the high-speed gear, thereby effectively reducing energy consumption. The gear can be automatically switched according to system requirements: the low-speed gear is used for low flow demand, so as to achieve silent operation and energy saving; while the high-speed gear is switched for high flow demand, so as to ensure rapid response.

The present disclosure is further configured as follows: the control center box further includes an air supply system arranged in the accommodating cavity and wrapped by the thermal insulation layer, where the air supply system includes an air valve, a control switch, and a third pipeline connected to the air valve, wherein the control switch is electrically connected to the air valve for controlling an operating state of the air valve, and the control switch is arranged on an outer surface of the box body. The air valve, the control switch, and the third pipeline are all internally arranged and share the accommodating cavity of the box body with the original water circuit system, making the structure compact and facilitating integrated control.

The present disclosure is further configured as follows: the control center box further includes a silencer and a loudspeaker arranged on the box body, wherein the first pipeline, the second pipeline, and the third pipeline all pass through the silencer; and the loudspeaker is signal-connected or electrically connected to the controller. Specifically, the silencer is a foam silencer made of porous foam material (such as foam aluminum, polyurethane foam). When sound waves enter microchannels of the foam material, sound energy is consumed through pore wall friction, air viscosity, and heat conduction effects. The first pipeline, the second pipeline, and the third pipeline all pass through the silencer, and the silencer cooperates with the box body to form a sealed integral structure, so as to block and absorb noise from the water pump and the air valve, and effectively reduce noise. The loudspeaker is a waterproof loudspeaker, ensuring sound clarity while providing waterproof performance.

The present disclosure is further configured as follows: the controller is electrically connected to a control panel, and the control panel is installed on the outer surface of the box body. The controller and the control panel are electrically connected through wires. The control panel is arranged to effectively realize human-machine interaction, such as real-time display of the temperature difference of inlet water and outlet water, monitoring of thermal efficiency attenuation, display of the air pressure curve of the air supply system for intelligent judgment of the air output status, and UV lamp service life reminder for early warning of replacement. In addition, the control panel can be signal-connected to a mobile phone, and control operations can be performed directly on a mobile phone application.

The present disclosure further provides a flexible bathtub, including a bathtub body, a water return pipe connector, a water outlet pipe connector, and the above control center box. The bathtub body includes:

- a tub body having an installation cavity, a water return inlet being provided in an inner wall of the tub body;
- a water return pipeline and a delivery pipeline that are arranged in the installation cavity, wherein the water return inlet and the water return pipe connector are in communication through the water return pipeline, and the delivery pipeline is in communication with the water outlet pipe connector;
- a plurality of nozzles, arranged on the inner wall of the tub body and all in communication with the delivery pipeline; and
- a filter arranged in the installation cavity, the filter being arranged on the water return pipeline;
- the water return pipe connector connects the first pipeline and the water return pipeline; the water outlet pipe connector connects the second pipeline and the delivery pipeline; and the control center box receives water from the bathtub body through the water return pipeline and returns water to the bathtub body through the delivery pipeline, thereby forming a closed water circulation path.

The flexible bathtub includes a tub body, wherein a delivery pipeline is arranged in the tub body; nozzles are arranged on the inner wall of the tub body and are in communication with the delivery pipeline; a water return inlet is opened on the inner wall of the tub body and is connected to a filter; the outside of the tub body is connected to a heater, a UV sterilizer, a water pump, a water return pipe connector, and a water outlet pipe connector. One end of the water return pipe connector is connected to the filter through a water return pipeline, and the other end is connected to the control center box through a first pipeline; one end of the water outlet pipe connector is in communication with the delivery pipeline, and the other end is connected to the control center box, thereby forming a water circulation path. The controller is electrically connected to the heater, the UV sterilizer, and the water pump respectively to realize integrated control. The bathtub of the present application is provided with a built-in pipeline and a filter is arranged at the water return inlet, so as to intercept hair and other debris, prevent the debris from entering the circulating pipeline, and ensure high-flow and low-resistance circulation of water flow.

The present disclosure is further configured as follows: the flexible bathtub further includes an air pipe connector and an air pipeline that are arranged in the installation cavity, wherein the air pipeline is in communication with at least one of the plurality of nozzles;

- the control center box further includes an air supply system arranged in the accommodating cavity and wrapped by the thermal insulation layer, wherein the air supply system includes an air valve, a control switch, and a third pipeline connected to the air valve; the control switch is electrically connected to the air valve for controlling an operating state of the air valve; and
- the air pipe connector connects the air pipeline and the third pipeline.

A plurality of micro-hole nozzles (also referred to as small nozzles, with a diameter approximately one fourth that of the large nozzles) dedicated to air injection may also be arranged on the inner wall of the tub body. The micro-hole nozzles are in communication with the air pipeline and are not in communication with the delivery pipeline. High-pressure gas is injected into water through the micro-holes of the nozzles to form turbulent bubble clusters. The bubbles burst during a rising process, generate an intermittent fluid impact force and provide a massage function.

The present disclosure is further configured as follows: the air pipe connector includes a first connecting pipe, a second connecting pipe, a first valve, and a first flexible joint; the first connecting pipe and the second connecting pipe are connected through the first valve; the first connecting pipe and the second connecting pipe are detachably connected to the third pipeline and the air pipeline respectively through the first flexible joint. The first valve may be a ball valve for controlling the on-off of fluid (gas).

The present disclosure is further configured as follows: both the water return pipe connector and the water outlet pipe connector each include a connector body, a second valve, and a second flexible joint; the connector body is arranged on the water pump; and the second valve is detachably connected to the connector body through the second flexible joint. The second valve may be a ball valve for controlling the on-off of fluid (water). In addition, the pressure-bearing capacity of the air pipe connector is smaller than that of the water outlet pipe connector and the water return pipe connector. Therefore, the second valves of the water outlet pipe connector and the water return pipe connector may adopt liquid ball valves, and the first valve of the air pipe connector adopts a pneumatic check ball valve. The connector body is a T-shaped three-way pipe, with a simple structure and convenient installation and connection.

The present disclosure is further configured as follows: the tub body is formed by thermally bonding composite EPE foam; a protective cover is sleeved on the tub body; an inner lining of the protective cover is wrapped on an outer wall of the tub body and made of a pearlescent PVC (Polyvinyl Chloride) film, and an outer lining of the protective cover is made of artificial leather; and a woven fabric is thermally bonded onto the outer wall of the tub body, arranged between the protective cover and the tub body, and made of IXPE (Irradiation Cross-linked Polyethylene) foam.

The present disclosure is further configured as follows: the filter includes a filter screen and a hollow filter body having a filter inlet and a filter outlet; the filter body is of an L-shaped structure; the filter screen is arranged at the filter inlet; and the filter outlet is in communication with the water return pipeline. The L-shaped filter body has a compact structure.

The present disclosure is further configured as follows: the filter further includes a retaining ring installed at the filter inlet; the filter screen is detachably connected to the retaining ring and provided with a tab; and the tab, when rotated, drives the filter screen to unlock or lock relative to the retaining ring, so as to realize the disassembly or assembly of the filter screen. Specifically, the retaining ring is connected to the filter inlet through an interference fit. A fixed protrusion may be arranged on the inner wall of the retaining ring, and a sliding groove is arranged on the filter screen; the fixed protrusion and the sliding groove are in sliding fit, enabling the filter screen to be opened or fixed on the retaining ring. However, the present disclosure is not limited thereto. The fixed protrusion may also be arranged on the filter screen, and the sliding groove may be arranged on the retaining ring, and detachable connection between the filter screen and the retaining ring can also be realized.

The present disclosure is further configured as follows: the interior of the filter is filled with filter cotton for filtering.

By adopting the above technical solutions, the beneficial effects of the present disclosure are as follows:

1. Traditional bathtubs made of acrylic and reinforced with resin are polluting and harmful to the health of operators. In contrast, the flexible bathtub is recyclable and pollution-free, achieving an environmental protection effect.
2. The water pump, the UV sterilizer, and the heater are integrated into a single unit, and the thermal insulation property of EPE foam is utilized to achieve an energy-saving effect.
3. Since the bathtubs are extremely lightweight, they can be installed at any outdoor location with unlimited location options, such that the bathtubs are more convenient.
4. Soft and stable EPE foam material are installed to enhance the comfort of the user.
5. A UV sterilizer is installed to provide an intensive water cleaning process, and the water resource can be used for a long time to achieve a cleaning function.

Figure 1:
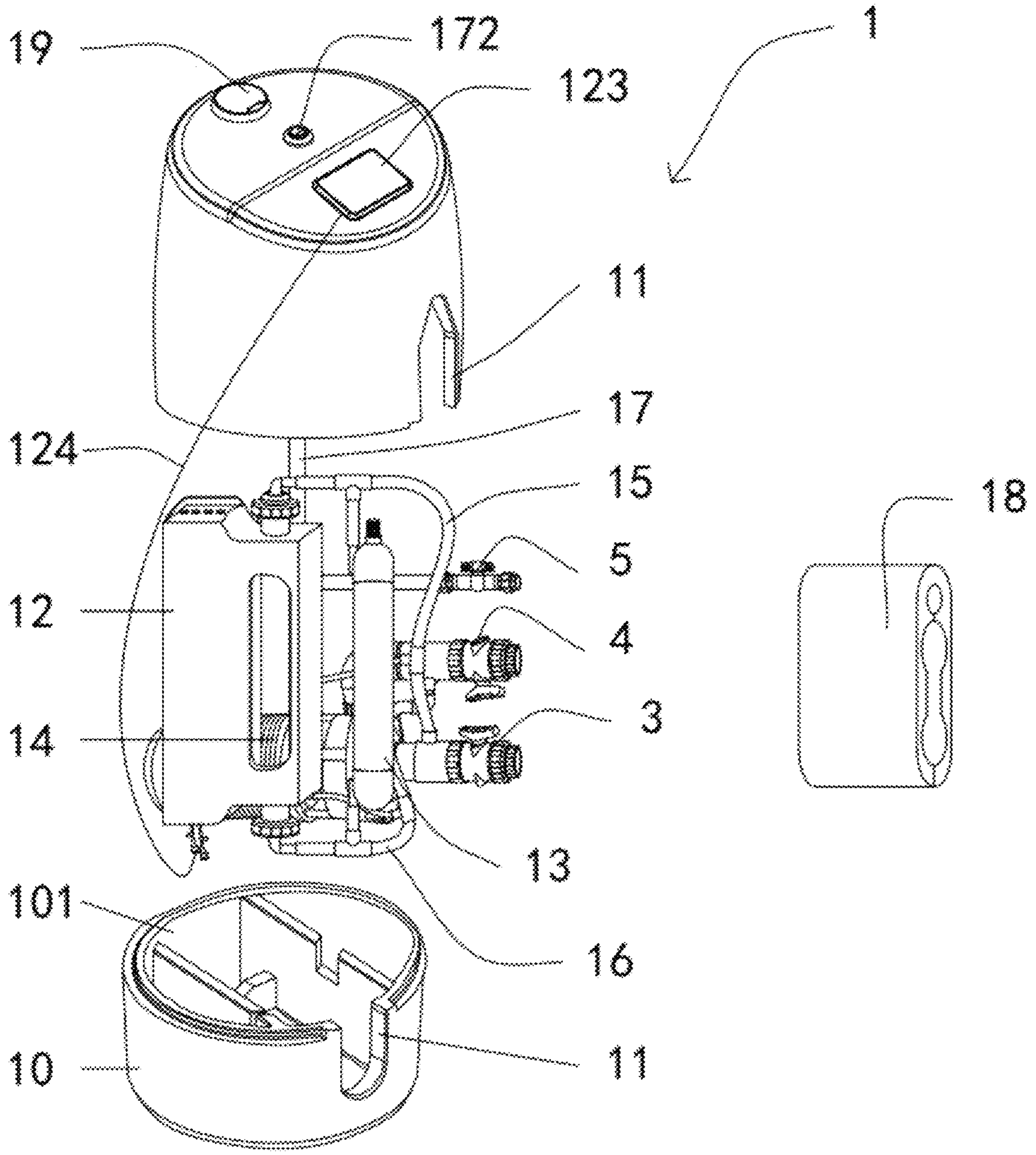
FIG. 1 is a schematic structural diagram of a control center box according to an embodiment of the present disclosure.

Reference numerals: 1. Control Center Box; 10. Box Body; 11. Thermal Insulation Layer; 12. Control System; 13. UV Sterilizer; 14. Water Pump; 15. First Pipeline; 16. Second Pipeline; 17. Air Supply System; 18. Silencer; 19. Loudspeaker; 101. Accommodating Cavity; 121. Controller; 122. Heater; **122*a*. Heating Chamber; 123. Control Panel; 124. Wire; 131. Sterilization Chamber; 141. Outer Wall of the Housing of the Water Pump; 142. Coil; 142*a*. Inlet End of the Coil; 142*b*. Outlet End of the Coil; 143. Dual-Speed Motor; 171. Air Valve; 172. Control Switch; 173**. Third Pipeline;

2. Bathtub Body; 3. Water Return Pipe Connector; 4. Water Outlet Pipe Connector; 5. Air Pipe Connector; 20. Tub Body; 21. Water Return Pipeline; 22. Delivery Pipeline; 23. Nozzle; 24. Filter; 25. Air Pipeline; 26. Connector Body; 27. Second Valve; 28. Second Flexible Joint; 51. First Connecting Pipe; 52. Second Connecting Pipe; 53. First Valve; 54. First Flexible Joint; 29. Protective Cover; 201. Installation Cavity; 202. Inner Wall of the Tub Body; 203. Water Return Inlet; 204. Outer Wall of the Tub Body; 231. Large Nozzle; 232. Small Nozzle; 241. Filter Screen; **241*a*. Tab; 242. Filter Body; 242*a*. Filter Inlet; 242*b*. Filter Outlet; 243. Retaining Ring; 244**. Filter Cotton.

DETAILED DESCRIPTION OF THE EMBODIMENTS

The technical solutions in the embodiments of the present disclosure will be clearly and completely described below in combination with the accompanying drawings in the embodiments of the present disclosure. Obviously, the described embodiments are only a part but not all of the embodiments of the present disclosure. Based on the embodiments of the present disclosure, all the other embodiments obtained by those skilled in the art without any creative effort shall fall within the protection scope of the present disclosure.

In the description of the present disclosure, it should be understood that the orientational or positional relationships indicated by such terms as "upper", "lower", "front", "rear", "left", "right", "top", "bottom", "inner", "outer" are based on the orientational or positional relationships shown in the accompanying drawings, and are only for the convenience of describing the present disclosure and simplifying the description, rather than indicating or implying that the referred device or element must have a specific orientation or must be constructed and operated in a specific orientation. Therefore, such terms shall not be construed as limiting the present disclosure.

Figure 2:
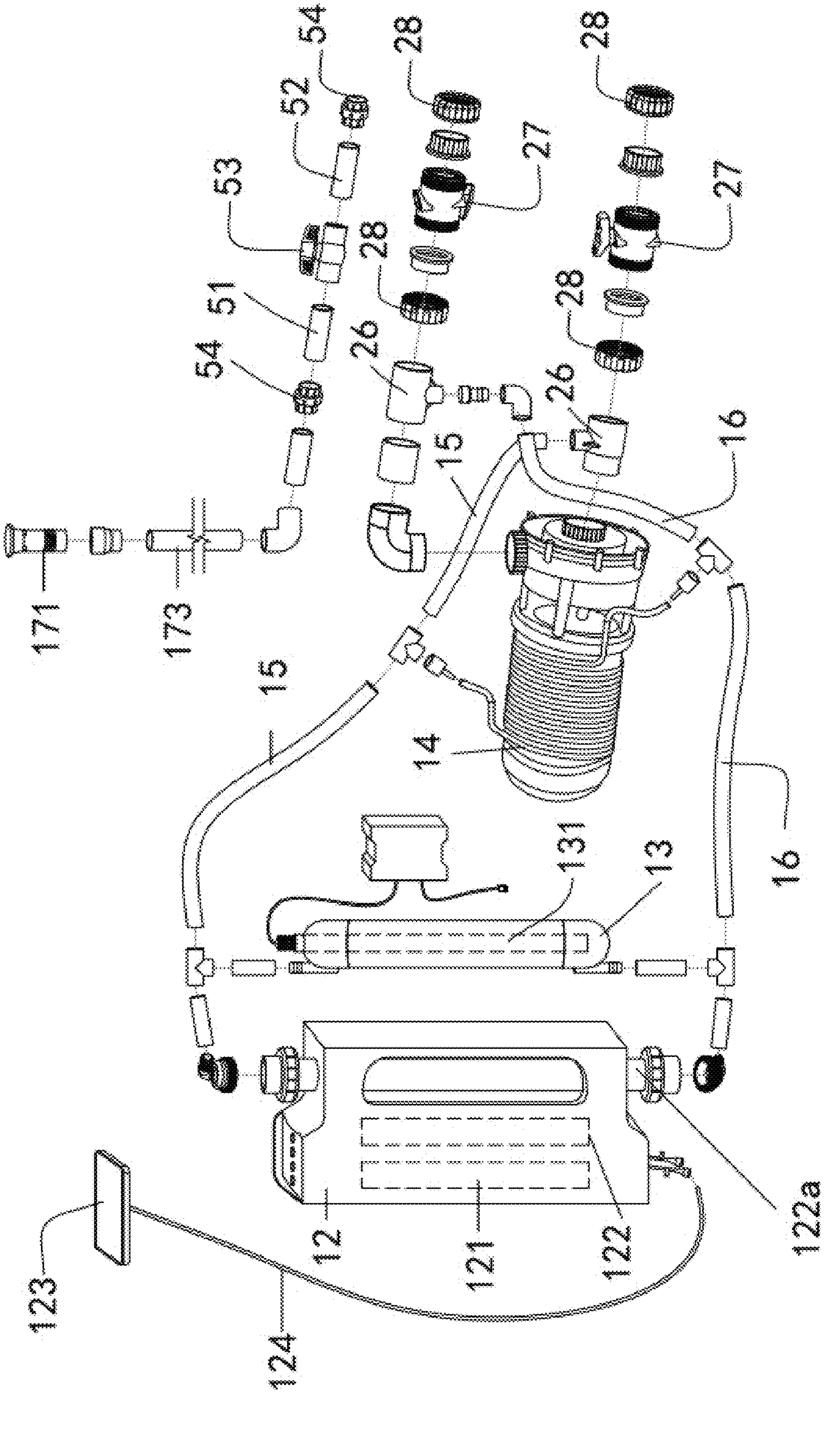
FIG. 2 is an exploded view of a control center box according to an embodiment of the present disclosure.

As shown in FIGS. 1 and 2, the present disclosure provides a control center box 1 suitable for a flexible bathtub, including: a box body 10 having an accommodating cavity 101; a thermal insulation layer 11 attached to an inner wall of the box body 10; and a control system 12, a UV sterilizer 13, a water pump 14, a first pipeline 15, and a second pipeline 16 which are arranged in the accommodating cavity 101 and wrapped by the thermal insulation layer 11. The control system 12 is integrated with a controller 121 and a heater 122 with a heating chamber 122*a*; the controller 121 is electrically connected to the heater 122, the water pump 14, and the UV sterilizer 13; the UV sterilizer 13 is internally provided with a sterilization chamber 131; both the heating chamber 122*a* and the sterilization chamber 131 are connected between the first pipeline 15 and the second pipeline 16; the water pump 14 drives water to flow through the first pipeline 15, the sterilization chamber 131, the heating chamber 122*a*, and the second pipeline 16 to form a water circulation path.

The control center box 1 is internally provided with the heater 122, the UV sterilizer 13, the water pump 14, and a control panel 123. The water pump 14 and the heater 122 are integrated into a single unit, and the thermal insulation property of EPE foam is utilized to achieve an energy-saving effect. The controller 121 is also located in the control center box 1, and the controller 121 is electrically connected to the heater 122, the UV sterilizer 13, the water pump 14, and the control panel 123 respectively. The controller 121 controls the start and stop of the water pump 14, the heating temperature of the heater 122, and the sterilization of the UV sterilizer 13. The UV sterilizer 13 is installed to provide an intensive water cleaning process, and the water resource can be used for a long time to achieve a cleaning function. The heating chamber 122*a* and the sterilization chamber 131 are arranged in parallel to form a parallel and co-directional water circulation path.

When the controller 121 operates, the water pump 14 starts running. Initially, the water pump 14 operates at a low speed to achieve an energy-saving effect. If the water pump 14 operates at a high speed from the beginning, the power will exceed a rated limit. The water pump 14 provides a massage and surfing function when in a high-speed state. The heater 122 is configured to maintain the water temperature, and the heating function can only be activated when the water pump 14 is running at a low speed.

Figure 3:
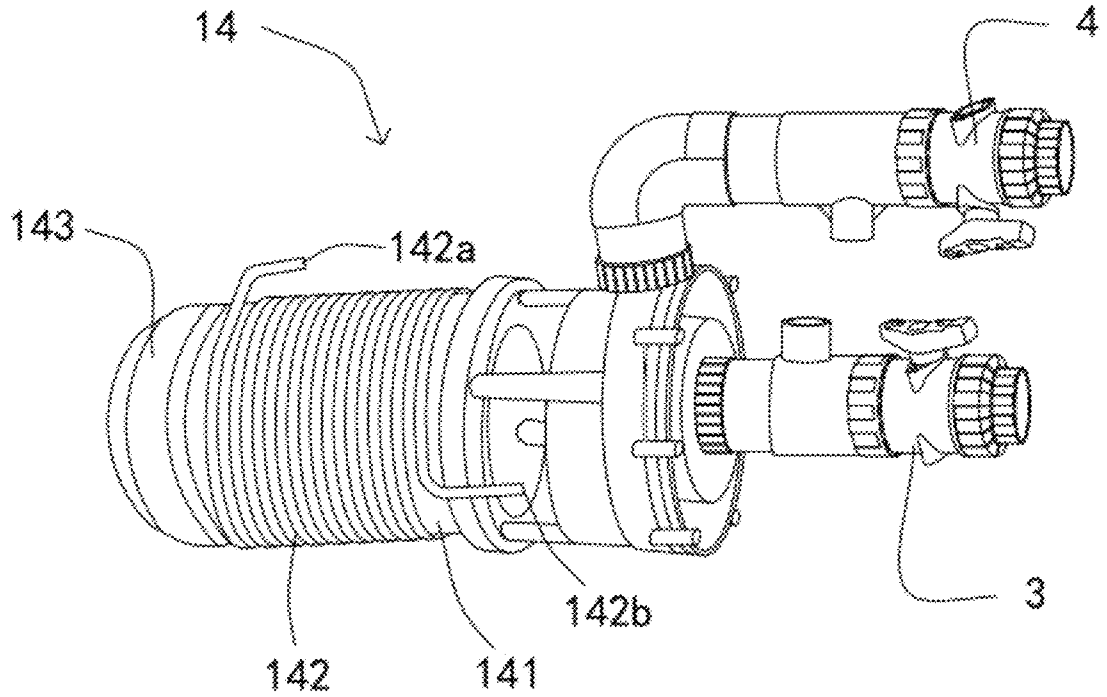
FIG. 3 is a schematic structural diagram of a water pump according to an embodiment of the present disclosure.

As shown in FIGS. 2 and 3, a coil 142 wound in a spiral manner is attached to an outer wall 141 of a housing of the water pump; an inlet end 142*a* of the coil is in communication with the first pipeline 15; and the outlet end 142*b* of the coil is in communication with the second pipeline 16. The water pump 14 is driven by a dual-speed motor 143, and the dual-speed motor 143 operates by switching between a low-speed gear and a high-speed gear.

As shown in FIGS. 1 and 2, the control center box 1 further includes an air supply system 17 arranged in the accommodating cavity 101 and wrapped by the thermal insulation layer 11; the air supply system 17 includes an air valve 171, a control switch 172, and a third pipeline 173 connected to the air valve 171, wherein the control switch 172 is electrically connected to the air valve 171 for controlling an operating state of the air valve 171, and the control switch 172 is arranged on the outer surface of the box body 10.

As shown in FIG. 1, the control center box 1 further includes a silencer 18 and a loudspeaker 19 arranged on the box body 10, wherein the first pipeline 15, the second pipeline 16, and the third pipeline 173 all pass through the silencer 18, and the loudspeaker 19 is signal-connected or electrically connected to the controller 121.

As shown in FIG. 1, the controller 121 is electrically connected to a control panel 123, and the control panel 123 is installed on an outer surface of the box body 10. The controller 121 and the control panel 123 are electrically connected through wires 124. For example, a plurality of buttons are installed on the control panel 123, and each button can be configured to activate or deactivate the control switch 172, start or stop the water pump 14, and turn on or turn off the heater 122, so as to facilitate user operation.

Figure 4:
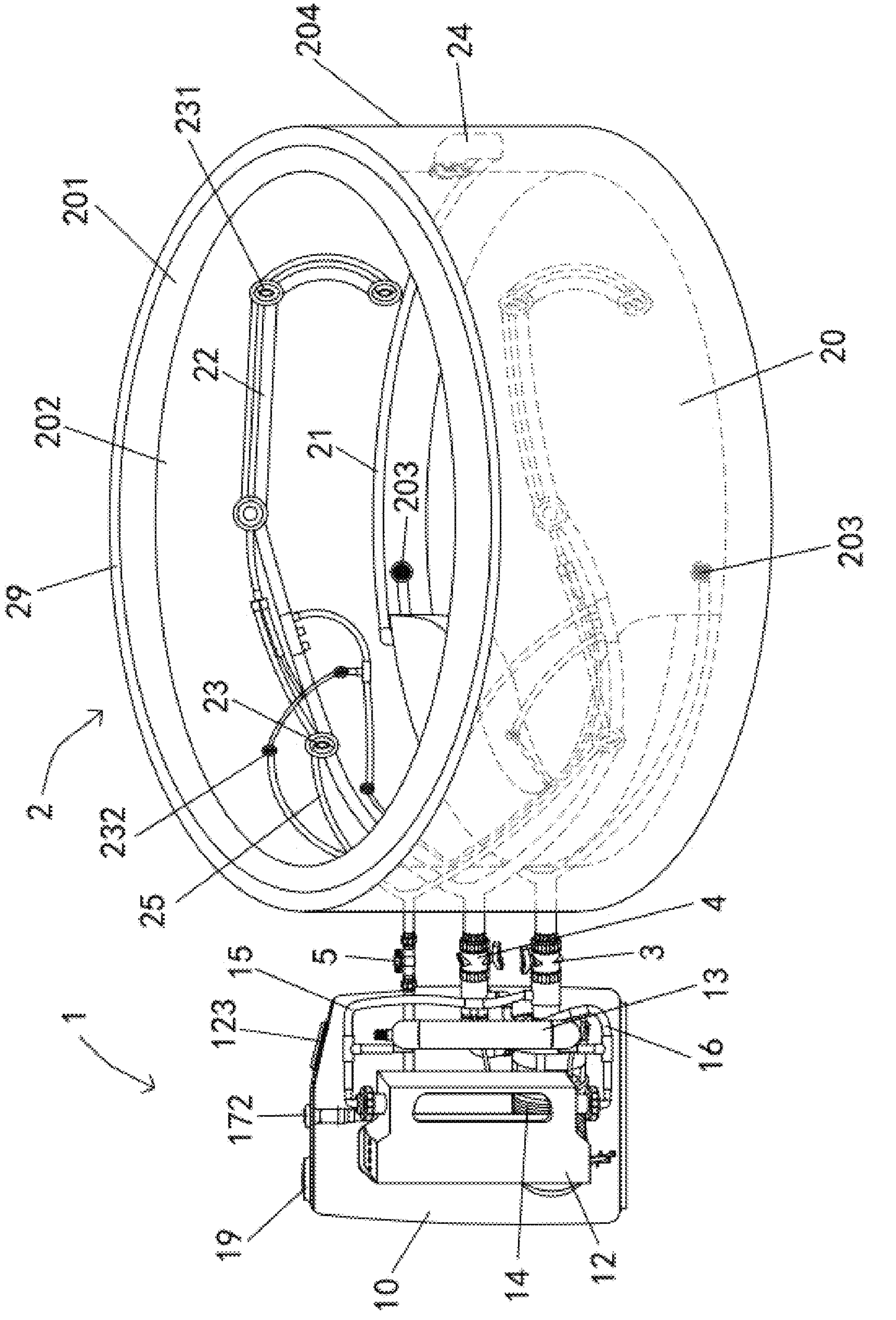
FIG. 4 is a schematic structural diagram of a flexible bathtub according to an embodiment of the present disclosure.

As shown in FIG. 4, the present disclosure further provides a flexible bathtub, including a bathtub body 2 and the above control center box 1. The bathtub body 2 includes: a tub body 20, a water return pipeline 21 and a delivery pipeline 22 that are arranged in the installation cavity 201, a plurality of nozzles 23, and a filter 24 arranged in the installation cavity 201. The tub body 20 is provided with an installation cavity 201, and the delivery pipeline 22 is pre-embedded in the installation cavity 201. The delivery pipeline 22 is in communication with the water outlet pipe connector 4. The plurality of nozzles 23 are arranged on the inner wall 202 of the tub body and are all in communication with the delivery pipeline 22, with water spray inlets of the nozzles 23 facing the center of the tub body 20. After the nozzles 23 and the delivery pipeline 22 are installed, a sealing sleeve is attached to the delivery pipeline 22. The sealing sleeve is made of artificial leather, and water can be added into the tub body 20 after the sealing sleeve is attached and fixed to the delivery pipeline 22.

The flexible bathtub is further provided with a water return pipe connector 3 and a water outlet pipe connector 4. One end of the water return pipe connector 3 is connected to the water return pipeline 21 and the filter 24, and the other end is connected to the first pipeline 15 of the control center box 1. One end of the water outlet pipe connector 4 is in communication with the delivery pipeline 22, and the other end is connected to the second pipeline 16 of the control center box 1. A water return inlet 203 is opened on the inner wall 202 of the tub body. The water return inlet 203 and the water return pipe connector 3 are in communication through the water return pipeline 21, and the filter 24 is arranged on the water return pipeline 21. The water return inlet 203 draws water from the tub body 20. The filter 24 includes a filter body 242 having a filter inlet 242*a* and a filter outlet

242*b*. The filter inlet 242*a* is in communication with the tub body 20, and the filter outlet 242*b* is in communication with the water return pipeline 21.

As shown in FIG. 4, the flexible bathtub includes a tub body 20. A delivery pipeline 22 is arranged in the tub body 20, and nozzles 23 are arranged on an inner wall of the tub body 20 and are in communication with the delivery pipeline 22. A water return inlet 203 is opened on the inner wall of the tub body 20, and the water return inlet 203 is connected to a filter 24. The outside of the tub body 20 is connected to a heater 122, a UV sterilizer 13, a water pump 14, a water return pipe connector 3, and a water outlet pipe connector 4. One end of the water return pipe connector 3 is connected to the filter 24 through a water return pipeline 21, and the other end is connected to the control center box 1 through a first pipeline 15. One end of the water outlet pipe connector 4 is in communication with the delivery pipeline 22, and the other end is connected to the control center box 1, thereby forming a water circulation path. The water in the tub body 20 is pumped out by the water pump 14, flows to the water return pipe connector 3 through the filter 24, then passes through the heater 122 and the UV sterilizer 13 in sequence, and finally flows from the water outlet pipe connector 4 to the nozzles 23 through the delivery pipeline 22 to be sprayed out.

As shown in FIGS. 2 and 4, the flexible bathtub further includes an air pipe connector 5 and an air pipeline 25 arranged in the installation cavity 201. The air pipeline 25 is in communication with at least one of the plurality of nozzles 23. The control center box 1 further includes an air supply system 17 arranged in the accommodating cavity 101 and wrapped by the thermal insulation layer 11. The air supply system 17 includes an air valve 171, a control switch 172, and a third pipeline 173 connected to the air valve 171. The control switch 172 is electrically connected to the air valve 171 for controlling an operating state of the air valve 171. The air pipe connector 5 connects the air pipeline 25 and the third pipeline 173, and the air pipe connector 5 is arranged on the air pipeline 25. Air is connected to the high-pressure water pipe respectively. When the control switch 172 is turned on, the water pressure is higher, so as to control the impact force of the water sprayed from the nozzles 23 (large nozzles 231 and small nozzles 232).

As shown in FIG. 2, the air pipe connector 5 includes a first connecting pipe 51, a second connecting pipe 52, a first valve 53, and a first flexible joint 54, wherein the first connecting pipe 51 and the second connecting pipe 52 are connected through the first valve 53; the first connecting pipe 51 is detachably connected to the third pipeline 173 through the first flexible joint 54; and the second connecting pipe 52 is detachably connected to the air pipeline 25 through the first flexible joint 54.

As shown in FIG. 2, both the water return pipe connector 3 and the water outlet pipe connector 4 include a connector body 26, a second valve 27, and a second flexible joint 28. The connector body 26 is arranged on the water pump 14, and the second valve 27 is detachably connected to the connector body 26 through the second flexible joint 28. Specifically, the connector body 26 of the water return pipe connector 3 is arranged at the inlet of the water pump 14, the water return pipeline 21 is detachably connected to the second valve 27 through the second flexible joint 28, and the first pipeline 15 is in communication with the connector body 26 of the water return pipe connector 3; the connector body 26 of the water outlet pipe connector 4 is arranged at the outlet of the water pump 14, the delivery pipeline 22 is detachably connected to the second valve 27 through the second flexible joint 28, and the second pipeline 16 is in communication with the connector body 26 of the water outlet pipe connector 4.

As shown in FIG. 4, the tub body 20 is formed by thermally bonding composite EPE foam. By adopting the soft and stable EPE foam material, the comfort experience for users is enhanced. A woven fabric is thermally bonded onto the outer wall of the tub body 20, and the woven fabric is made of IXPE (Irradiation Cross-linked Polyethylene) foam to improve structural strength and thermal insulation performance. A base is further installed on the bottom surface of the tub body 20, and the base bonds the bottom XPE (X-linked Polyethylene) thermal insulation foam to the tub body 20 through hot-melt technology, so as to ensure the stability and thermal insulation effect of the overall structure. A cushion is also arranged on the inner wall of the tub body 20, and the cushion is integrally formed with the tub body 20, thereby improving the convenience and comfort of use. The flexible bathtub is recyclable and pollution-free, and achieves an environmental protection effect. A protective cover 29 is further arranged on the outer wall 204 of the tub body, and the protective cover 29 is sleeved on the tub body 20, such that the inner lining of the protective cover 29 is attached to the woven fabric. The inner lining of the protective cover 29 is made of pearlescent PVC film, and the outer lining of the protective cover 29 is artificial leather, thereby not only ensuring waterproof performance, but also enhancing the tactile comfort.

Figure 5:
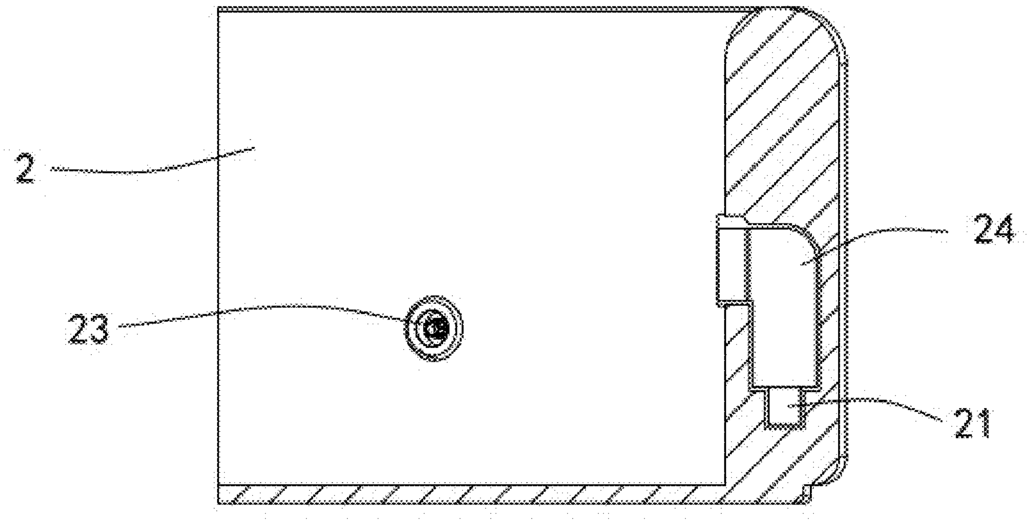
FIG. 5 is a schematic structural diagram of the cooperation between a filter and a bathtub body according to an embodiment of the present disclosure.
Figure 6:
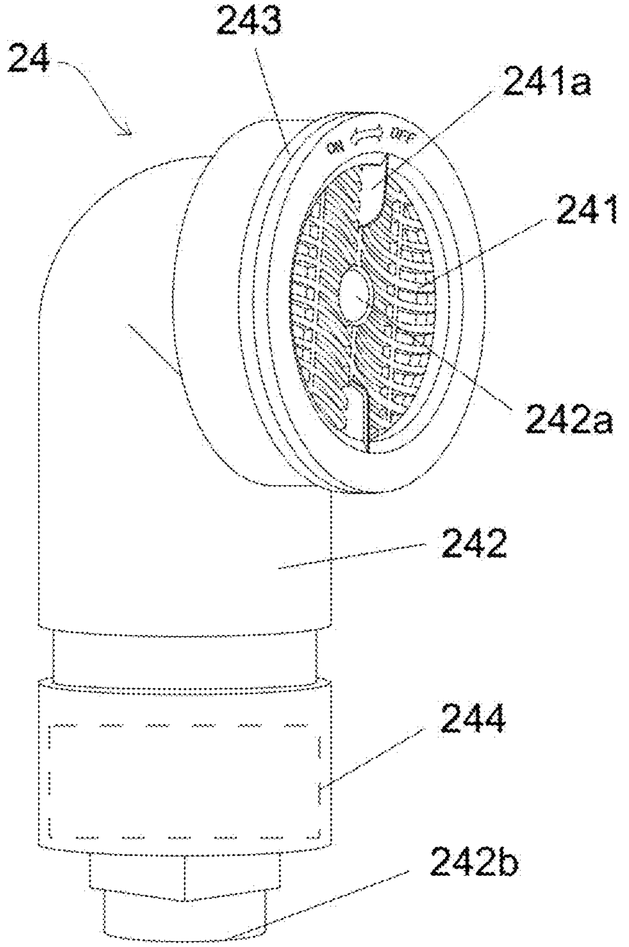
FIG. 6 is a schematic structural diagram of a filter according to an embodiment of the present disclosure.

As shown in FIGS. 5 and 6, the filter 24 includes a filter screen 241 and a hollow filter body 242 having a filter inlet 242*a* and a filter outlet 242*b*. The filter screen 241 is arranged at the filter inlet 242*a*, and the filter outlet 242*b* is in communication with the water return pipeline 21. The filter body 242 is L-shaped, and the interior of the filter body 242 is filled with filter cotton 244. The filter cotton 244 absorbs impurities in the water. When a large number of impurities are accumulated in the filter cotton 244, since the filter screen 241 is arranged at the filter inlet 242*a*, the user can open the filter screen 241, reach into the filter inlet 242*a* to take out the filter cotton 244 from the filter inlet 242*a*, and the filter cotton 244 in the filter inlet 242*a* will be pulled out together with the filter cotton 244 in the filter outlet 242*b*. Then, a new filter cotton 244 is reinserted from the filter inlet 242*a*, and the filter cotton 244 passes through the filter inlet 242*a* and the filter outlet 242*b* in sequence, such that both the filter inlet 242*a* and the filter outlet 242*b* are filled with the filter cotton 244, thereby not only facilitating the operation of the user, but also ensuring a continuous and stable filtering effect.

Figure 7:
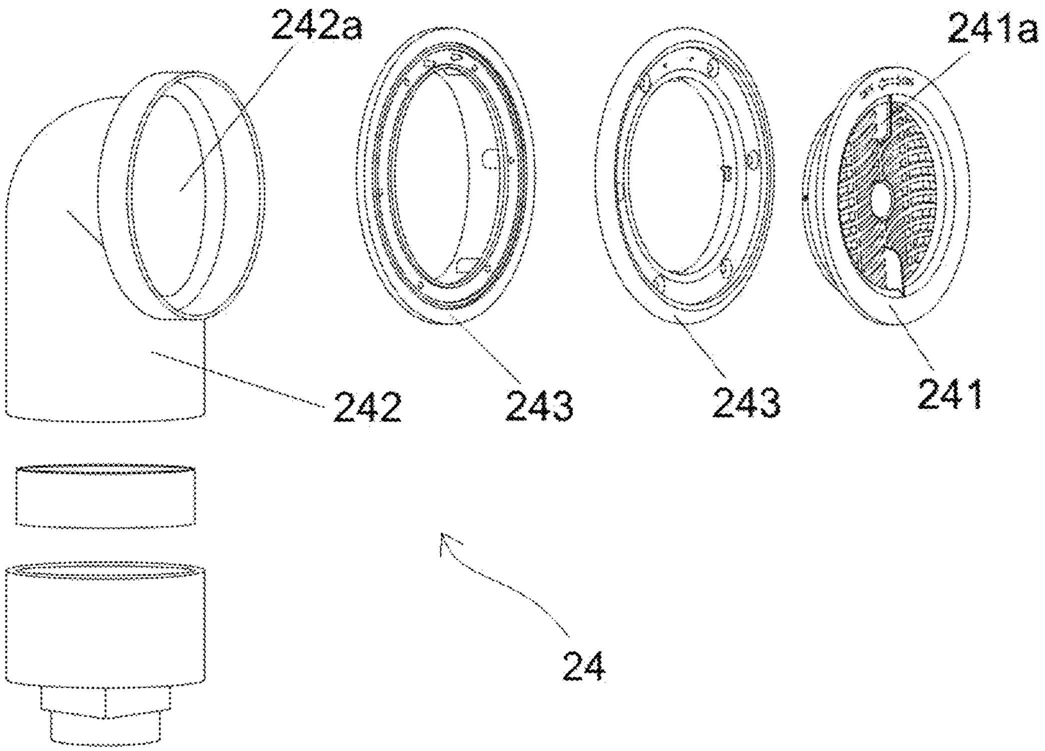
FIG. 7 is an exploded view of a filter according to an embodiment of the present disclosure.

As shown in FIG. 7, the filter 24 further includes a retaining ring 243 installed at the filter inlet 242*a*. The filter screen 241 is rotatably connected to the retaining ring 243, and the filter screen 241 is provided with a tab 241*a*. The tab 241*a*, when rotated, drives the filter screen to unlock or lock relative to the retaining ring. The retaining ring 243 is connected to the filter inlet 242*a* through an interference fit. The interior of the filter 24 is filled with filter cotton 244 for filtering.

Working principle: water is added into the tub body 20. When the controller 121 receives an instruction, the water pump 14 will start first to provide power for the entire water circulation system. With the startup of the water pump 14, the water stored in the tub body 20 is pumped from the water return inlet 203 into the filter 24. The pumped water passes through the filter cotton 244 inside the filter 24 in sequence for filtering. One part of the filtered water is sent to the heater 122 through the water return pipe connector 3 for heating, and the other part is sent to the UV sterilizer 13 for sterilization. Afterwards, the heated and sterilized water enters the delivery pipeline 22 along the water return pipe connector 3, ensuring that the water flows smoothly and evenly from each of the small nozzles 232 and large nozzles 231. At this time, a closed-loop water circulation system is formed, and environmental protection, energy saving, portability, comfort, and cleanliness are achieved.

The above descriptions are only preferred embodiments of the present disclosure and are not intended to limit the present disclosure. Ordinary changes and substitutions made by those skilled in the art within the scope of the technical solutions of the present disclosure shall all be included in the protection scope of the present disclosure.

What is claimed is:

1. A control center box suitable for adapted to a flexible bathtub, comprising:

a box body having an accommodating cavity;

a thermal insulation layer attached to an inner wall of the box body; and a control system, a UV sterilizer, a water pump, a first pipeline, and a second pipeline which are arranged in the accommodating cavity and wrapped by the thermal insulation layer, wherein the control system is integrated with a controller and a heater with a heating chamber, the controller is electrically connected to the heater, the water pump, and the UV sterilizer, the UV sterilizer is internally provided with a sterilization chamber, both the heating chamber and the sterilization chamber are connected between the first pipeline and the second pipeline, and the water pump drives water to flow through the first pipeline, the sterilization chamber, the heating chamber, and the second pipeline to form a water circulation path.

2. The control center box adapted to a flexible bathtub according to claim 1, wherein the heating chamber and the sterilization chamber are arranged in parallel to form a parallel and co-directional water circulation path.

3. The control center box adapted to a flexible bathtub according to claim 1, wherein a coil wound in a spiral manner is attached to an outer wall of a housing of the water pump, an inlet end of the coil is in communication with the first pipeline; and an outlet end of the coil is in communication with the second pipeline.

4. The control center box adapted to a flexible bathtub according to claim 3, wherein the water pump is driven by a dual-speed motor, and the dual-speed motor operates by switching between a low-speed gear and a high-speed gear, a flow rate of the low-speed gear being 40% to 60% of a rated flow rate, and a flow rate of the high-speed gear being 85% to 105% of the rated flow rate.

5. The control center box adapted to a flexible bathtub according to claim 1, further comprising an air supply system arranged in the accommodating cavity and wrapped by the thermal insulation layer, wherein the air supply system comprises an air valve, a control switch, and a third pipeline connected to the air valve, and the control switch is electrically connected to the air valve for controlling an operating state of the air valve.

6. The control center box adapted to a flexible bathtub according to claim 5, further comprising a silencer and a loudspeaker arranged on the box body, wherein the first pipeline, the second pipeline, and the third pipeline all pass through the silencer; and the loudspeaker is signal-connected or electrically connected to the controller.

7. The control center box adapted to a flexible bathtub according to claim 1, wherein the controller is electrically connected to a control panel.

8. A flexible bathtub, comprising a bathtub body, a water return pipe connector, a water outlet pipe connector, and the control center box according to claim 1, wherein the bathtub body comprises:

a tub body having an installation cavity, a water return inlet being provided in an inner wall of the tub body;

a water return pipeline and a delivery pipeline that are arranged in the installation cavity, wherein the water return inlet and the water return pipe connector are in communication through the water return pipeline, and the delivery pipeline is in communication with the water outlet pipe connector;

a plurality of nozzles, arranged on the inner wall of the tub body and all in communication with the delivery pipeline; and a filter arranged in the installation cavity, the filter being arranged on the water return pipeline;

the water return pipe connector connects the first pipeline and the water return pipeline, the water outlet pipe connector connects the second pipeline and the delivery pipeline, and the control center box receives water from the bathtub body through the water return pipeline and returns water to the bathtub body through the delivery pipeline, thereby forming a closed water circulation path.

9. The flexible bathtub according to claim 8, further comprising an air pipe connector and an air pipeline arranged in the installation cavity, wherein the air pipeline is in communication with at least one of the plurality of nozzles;

the control center box further comprises an air supply system arranged in the accommodating cavity and wrapped by the thermal insulation layer, the air supply system comprises an air valve, a control switch, and a third pipeline connected to the air valve, the control switch is electrically connected to the air valve for controlling an operating state of the air valve; and the air pipe connector connects the air pipeline and the third pipeline.

10. The flexible bathtub according to claim 9, wherein the air pipe connector comprises a first connecting pipe, a second connecting pipe, a first valve, and a first flexible joint, the first connecting pipe and the second connecting pipe are connected through the first valve, the first connecting pipe and the second connecting pipe are detachably connected to the third pipeline and the air pipeline through the first flexible joint.

11. The flexible bathtub according to claim 8, wherein both the water return pipe connector and the water outlet pipe connector each comprise a connector body, a second valve, and a second flexible joint, the connector body is arranged on the water pump, and the second valve is detachably connected to the connector body through the second flexible joint.

12. The flexible bathtub according to claim 8, wherein the tub body is formed by thermally bonding composite Expanded Polyethylene foam, a protective cover is sleeved on the tub body, an inner lining of the protective cover is wrapped on an outer wall of the tub body and made of a pearlescent Polyvinyl Chloride film, and an outer lining of the protective cover is made of artificial leather, and a woven fabric is thermally bonded onto the outer wall of the tub body, arranged between the protective cover and the tub body, and made of Irradiation Cross-linked Polyethylene foam.

13. The flexible bathtub according to claim 8, wherein the filter comprises a filter screen and a hollow filter body having a filter inlet and a filter outlet, the filter body is of an L-shaped structure, the filter screen is arranged at the filter inlet; and the filter outlet is in communication with the water return pipeline.

14. The flexible bathtub according to claim 13, wherein the filter further comprises a retaining ring installed at the filter inlet, the filter screen is detachably connected to the retaining ring and provided with a tab, and the tab, when rotated, drives the filter screen to unlock or lock relative to the retaining ring.

15. The flexible bathtub according to claim 13, wherein the interior of the filter is filled with filter cotton for filtering.

* * * * *